United States Patent [19]

Banks

[11] Patent Number: 5,012,062
[45] Date of Patent: Apr. 30, 1991

[54] ARC-TEXTURED HIGH EMITTANCE RADIATOR SURFACES

[75] Inventor: Bruce A. Banks, Olmsted Township, Cuyahoga County, Ohio

[73] Assignee: The United States of America as represented by the Administrator of the National Aeronautics and Space Administration, Washington, D.C.

[21] Appl. No.: 381,240

[22] Filed: Jul. 18, 1989

[51] Int. Cl.$^5$ .............................................. B23H 9/00
[52] U.S. Cl. .................................................. 219/69.11
[58] Field of Search ...................... 219/68, 69.17, 354, 219/345, 69.15, 69.14, 540; 392/432, 433, 434

[56] References Cited

U.S. PATENT DOCUMENTS

| | | | |
|---|---|---|---|
| 2,152,934 | 4/1939 | Trent | 219/345 |
| 2,427,588 | 9/1947 | Burnett | 219/69.15 |
| 3,539,770 | 11/1970 | Wallace | 219/354 |
| 3,585,342 | 6/1971 | Kosco | 219/69.15 |
| 3,619,881 | 11/1971 | Bills et al. | 29/121 R |
| 3,754,873 | 8/1973 | Bills et al. | 219/69.17 |
| 3,787,191 | 1/1974 | Duncan | 29/191 |
| 3,909,592 | 9/1975 | Eide | 219/540 |
| 3,941,970 | 3/1976 | Grow | 219/69.17 |
| 4,016,446 | 4/1977 | Cadoff | 350/355 |
| 4,098,956 | 7/1978 | Blickensderfer et al. | 428/627 |
| 4,284,956 | 8/1981 | Leffmann | 328/140 |
| 4,412,126 | 10/1983 | Brockway | 219/354 |
| 4,478,209 | 10/1984 | Guarnieri | 126/417 |

FOREIGN PATENT DOCUMENTS 261046 3/1958 Australia ........................ 219/69.14

*Primary Examiner*—Geoffrey S. Evans
*Attorney, Agent, or Firm*—Gene E. Shook; John R. Manning; James A. Mackin

[57] ABSTRACT

High emittance radiator surfaces are produced by arc-texturing. This process produces such a surface on a metal by scanning it with a low voltage electric arc from a carbon electrode in an inert environment.

14 Claims, 2 Drawing Sheets

ARC-TEXTURED HIGH EMITTANCE RADIATOR SURFACES

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with the production of durable high thermal emittance surfaces. The invention is particularly directed to high emittance radiator surfaces that are produced by arc texturing. The invention is further directed to high thermal emittance surfaces that are suitable for space applications.

High thermal emittance surfaces are customarily produced by paints or coatings. Materials such as zinc oxide, zinc orthotitanate, and titanium dioxide have been used with organic and inorganic binders to provide high emittance surfaces.

These high emittance coatings generally have been used to enhance heat rejection from electronic components. Many of these high emittance coatings are required to function on surfaces which have solar illumination and they require surfaces that also have low solar absorptance.

Thermal control coatings are typically required to function at temperatures within 200° C. of room temperature. Chemical conversion coatings, such as anodized aluminum, also have been used for high emittance heat rejection.

It has been found that the durability of these prior art coatings is not sufficient for high temperature space applications. Previous paints or thick coatings easily spall because of the thermal expansion mismatch between the coatings and the substrate radiator materials.

Radiators which operate at temperatures up to 900° K. require coatings or modified surfaces that do not interact with the metallurgy of the bulk radiator material. For example, radiators composed of Nb-1%Zr are sensitive to oxygen and hydrogen embrittlement. Thus, to achieve high emittance the altered surface of the Nb-1%Zr radiator or the technique used to alter the surface must not provide oxygen or hydrogen which can diffuse into the niobium thereby causing it to embrittle under mechanical stress.

High emittance coatings which have emittance properties that are derived from the chemistry rather than the morphology of the coating are sensitive to chemical contamination from the effluence of space systems. This contamination can cause the emittance to degrade in time.

Chemical conversion coatings, such as anodized aluminum, are more integral with the substrate radiator surface. However, these coatings are sensitive to in-space chemical contamination.

Anodized coatings would provide oxygen for oxygen embrittlement of radiator materials, such as Nb-1%Zr. Anodized aluminum cannot be used for high temperature radiator applications because of the low melting temperature of aluminum.

It is, therefore, an object of the present invention to produce a durable high thermal emittance surface suitable for space applications.

Another object of the invention is to provide an improved method for making durable high thermal emittance surfaces.

BACKGROUND ART

Bills et al U.S. Pat. No. 3,619,881 describes a work roll for cold rolling sheets or strips. The rolls are textured or roughened by electric discharge machining which generates shallow depressions in the outer surface of the roll for desired roughening. No particular alloy is required to make the roll, nor is there any suggestion of the type of environment utilized.

DISCLOSURE OF THE INVENTION

The objects of the invention are achieved and the problems encountered in the prior art are solved by the present invention which utilizes an arc texturing process to produce high emittance radiator surfaces. The process produces such a surface on an alloy by scanning it with a low voltage electric arc from a nonconsumable electrode in an inert environment. Argon gas may be utilized to produce this inert environment.

BRIEF DESCRIPTION OF THE DRAWINGS

The objects, advantages, and novel features of the invention will be more fully apparent from the following detailed description when read in connection with the accompanying drawings wherein.

BEST MODE FOR CARRYING OUT THE INVENTION

Figure 1:
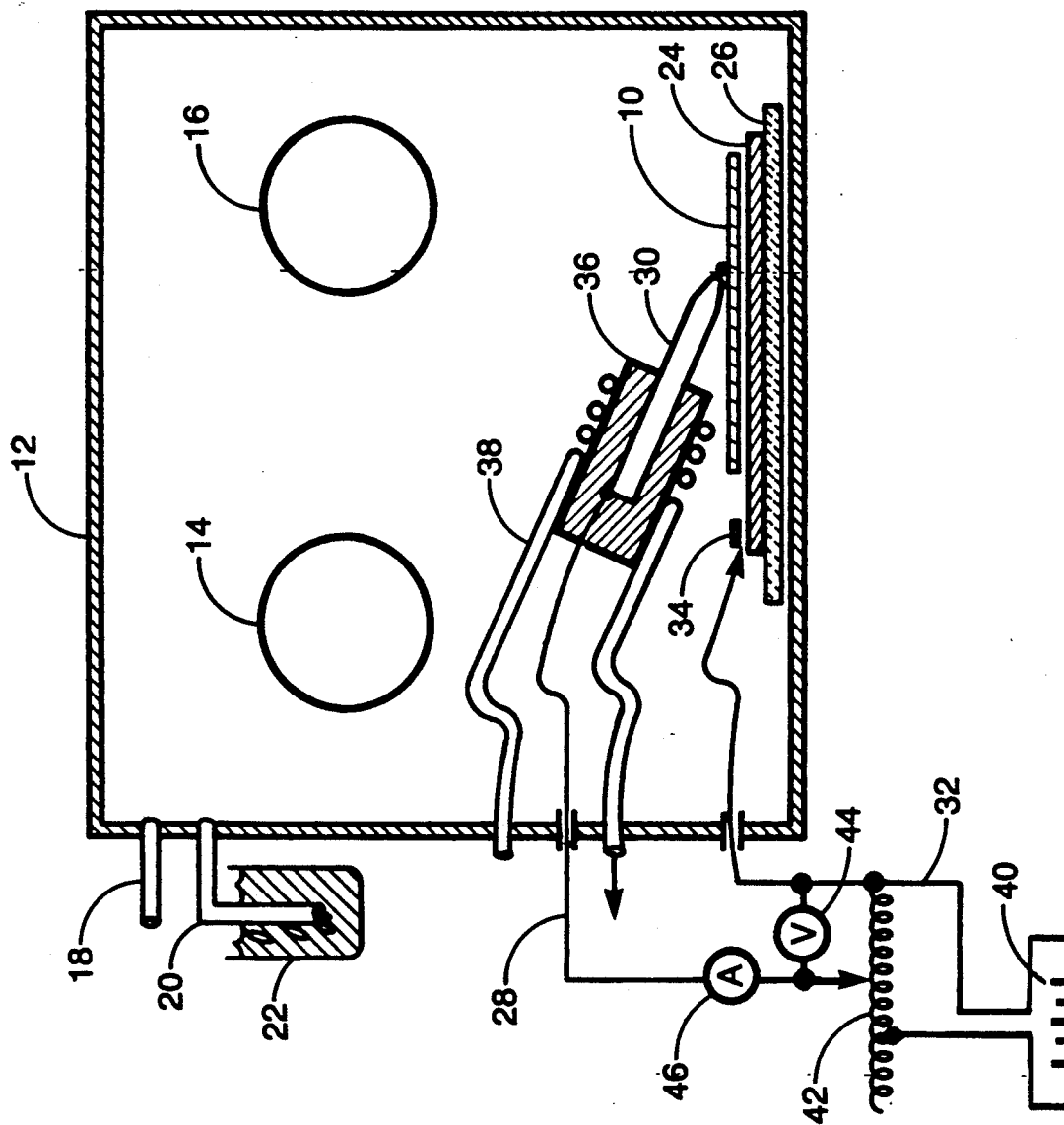
FIG. 1 is a schematic view showing the apparatus for producing high emittance radiator surfaces in accordance with the present invention.

Referring now to FIG. 1 there is shown apparatus for producing a durable high thermal emittance surface on a radiator 10 or other component. A chamber 12 in the form of a glove box is provided for enclosing the radiator. A pair of apertures 14 and 16 are formed in a wall of the chamber. Gloves (not shown) are secured to these apertures in a manner well known in the art.

An inlet pipe 18 is connected to a source (not shown) of an inert gas, such as argon. This inert gas circulates through the chamber 12 and exits through a discharge pipe 20 connected to a bubbler 22.

The use of a glove box may not be practical in some applications. A sheath of inert gas at the site of the arc may be adequate to prevent oxidation if a glove box is impractical.

The radiator 10 or component is supported by a copper plate 24 in the chamber 12. This copper plate 24 is mounted on an electric insulator pad 26 at the base of chamber 12.

An electric lead 28 is attached to a carbon electrode 30 which is preferably graphite and operably connected to the radiator 10. A similar electric lead 32 is connected to the copper plate 24 by a suitable screw 34.

It will be appreciated that the component to be textured need not be supported by the copper plate 24. The lead 32 may be electrically connected directly to the surface of the radiator 10.

A moveable electrode actuator 36 is provided for selectively positioning the electrode 30 relative to the surface of the radiator 10. A cooling fluid, such as water, passes through a line 38 which encircles the actuator 36.

The electric line 32 is connected to a power source 40 while the electric line 28 is likewise connected to this power source through a controller 42 in the form of a variable resistance. A voltmeter 44 measures the potential between the leads 28 and 32 while an ammeter 46 measures current flow.

An electric arc is struck between the graphite electrode 30 and the surface of the radiator 10 or other component whose emittance is to be enhanced. The arc supply characteristics are an open circuit AC voltage of 0 to 20 volts and an arc current of 0 to 15 amperes.

AC arcs, DC arcs and AC arcs of variable frequencies have been examined to optimize the emittance resulting from arc-texturing. It has been found that arc frequencies of approximately 100 cycles per second yield the highest thermal emittances.

The graphite electrode 30 and its associated arc is then moved back and forth across the surface of the component 10 whose emittance is to be enhanced. This is accomplished by moving the electrode actuator 36. While the carbon rod forming the electrode 30 may be positioned by manually moving the actuator 36, it is contemplated in the preferred embodiment that this electrode actuator may be moved automatically.

Gradual movement of the electrode actuator 36 insures that all areas of the surface are exposed to the electric arc. The interaction of the carbon arc with the surface of the radiator causes a very rough surface to be developed. This surface is predominately composed of the bulk radiator material.

As a result of the arc treatment of the surface of the component 10, a material such as niobium containing 1% zirconium changes from a very smooth surface with a thermal emittance at 800° K. of 0.06 to a matte gray/black surface with a thermal emittance of approximately 0.8 at 800° K. This is illustrated by the solid lines in FIG. 2.

Figure 2:
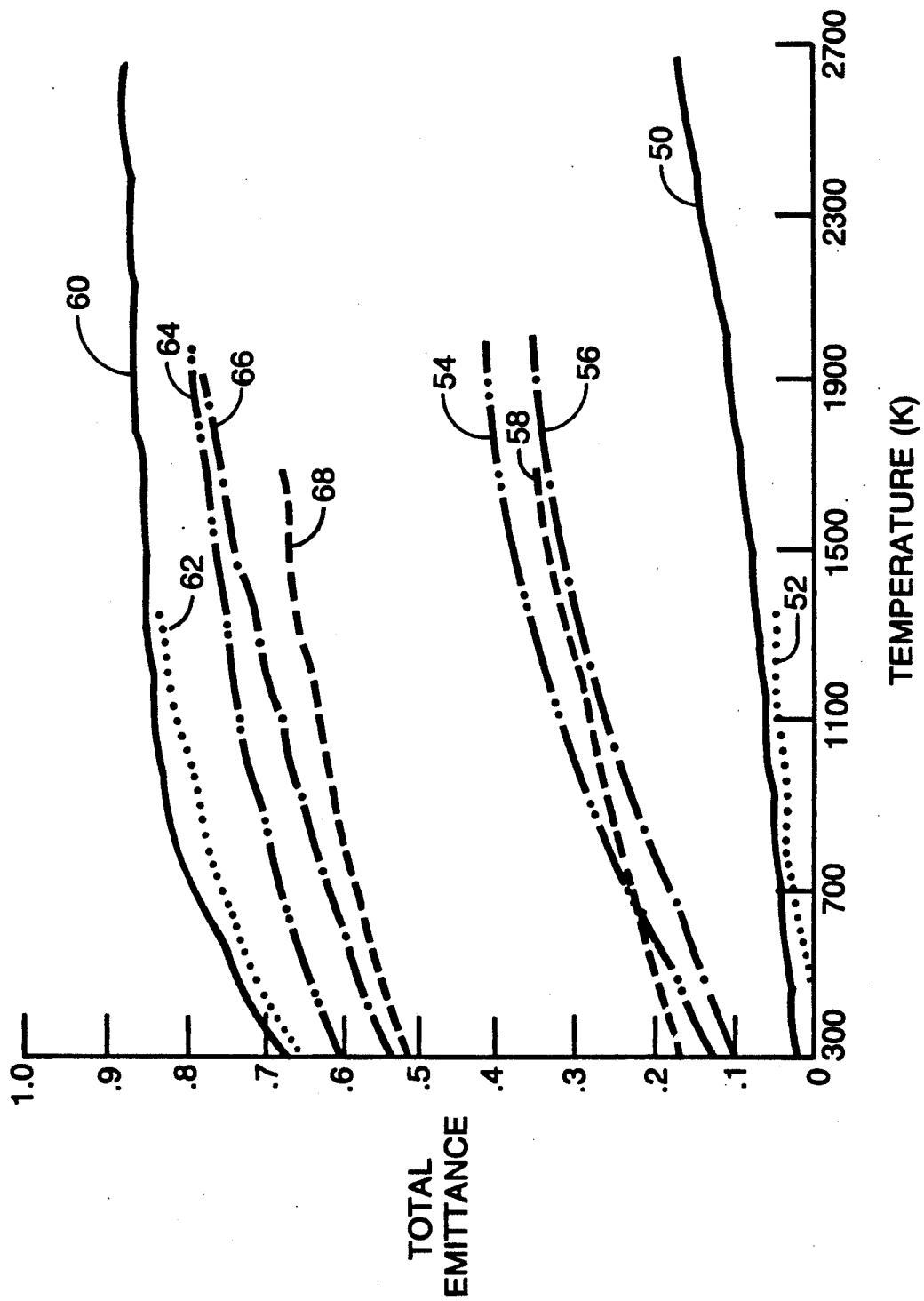
FIG. 2 is a graph showing total emittance plotted against radiator temperature for untreated and AC arc-textured surfaces of various materials.

It has been found that Nb - 1% Zr is not the only material that can be textured successfully. Inconel, copper, tungsten, molybdenum, stainless steel, rhenium, titanium and titanium alloys develop high thermal emittance as a result of carbon arc-texturing. Referring to FIG. 2 there is shown total emittances of various materials plotted against temperature for untreated surfaces as well as surfaces arc-textured in accordance with the present invention.

Untreated niobium alloyed with one percent zirconium is shown by line 50 while this same material arc-textured in accordance with the present invention is shown by the line 60. Untreated copper is shown by the line 52, and arc-textured copper is plotted by the line 62.

Line 54 illustrates untreated titanium while the surface of this same metal arc-textured in accordance with the invention is shown by the line 64. Untreated titanium alloyed with 6% aluminum and four percent vanadium is covered by the line 56. This same alloy that has been arc-textured is shown by the line 66. The untreated surface of type 304 stainless steel is illustrated by the line 58 while arc-textured 304 stainless steel is covered by the line 68.

An important feature of the invention is that the arc-textured surface is integral with the substrate: It is not a coating. This treatment prevents the surface from spalling because it is essentially composed of the same material as the substrate; therefore it has a thermal expansion coefficient closely matching that of the substrate.

The improved emittance surface cannot cause oxygen or hydrogen embrittlement of the substrate materials, such as niobium-1% zirconium, because the coating is essentially the bulk radiator material free of oxygen or hydrogen. The high emittance of the arc-treated surface is predominantly the result of microscopic roughening rather than chemical alteration of the surface. Therefore, the arc-textured surface is more immune to in-space chemical contamination than smooth chemically dominated high emittance surfaces.

Surfaces that are arc-textured in accordance with the invention enable radiators to operate at temperatures equal to the highest temperature of the bulk material. At the present time the operating temperature is limited by the constraints of the radiator surface.

While the preferred embodiment of the invention has been shown and described it will be appreciated various modifications may be made to the apparatus and method without departing from the spirit of the invention of the scope of the subjoining claims. By way of example a variety of inert gases may be used to surround the surface to be treated and the carbon arc. Also, the arc electrode may be a variety of geometries, and the arc supply can have different open circuit voltages or short circuit currents as well as being direct current rather than alternating current.

I claim:

1. Apparatus for producing a durable high thermal emittance surface on a radiator comprising
   a glove box for enclosing said radiator,
   means for supplying an inert gas to said glove box thereby forming a sheath at a surface on said radiator to prevent oxidation thereof,
   an electrode for forming an arc at said surface in said sheath, and
   means for mounting said electrode adjacent to said radiator and moving the same relative to said surface in said sheath.

2. Apparatus for producing a durable high thermal emittance surface as claimed in claim 1 whereon argon is supplied to the glove box.

3. Apparatus for producing a durable high thermal emittance surface on a radiator comprising
   a chamber for enclosing said radiator,
   a copper plate for supporting said radiator in said chamber,
   an insulator positioned between said copper plate and said chamber,
   means for supplying an inert gas to said chamber thereby forming a sheath at said surface to prevent oxidation thereof,
   an electrode for forming an arc at said surface in said sheath, and
   means for mounting said electrode adjacent to said radiator and moving the same relative to said surface in said sheath.

4. Apparatus for producing a durable high thermal emittance surface as claimed in claim 3 wherein the electrode is graphite.

5. Apparatus for producing a durable high thermal emittance surface as claimed in claim 4 including a selectively moveable electrode actuator for mounting said graphite electrode.

6. Apparatus for producing a durable high thermal emittance surface as claimed in claim 5 wherein said electrode actuator is copper.

7. Apparatus for producing a durable high thermal emittance surface as claimed in claim 6 including means for selectively cooling said copper actuator and graphite electrode as they move along the surface of the radiator.

8. Apparatus for producing a durable high thermal emittance surface as claimed in claim 3 wherein the radiator is niobium containing 1% zirconium.

9. Apparatus for producing a durable high thermal emittance surface as claimed in claim 3 wherein the radiator is a metal selected from the group consisting of copper, tungsten, molybdenum, stainless steel, and rhenium.

10. A method of producing a durable high thermal emittance surface on a niobium radiator containing about 1% zirconium comprising covering a portion of the surface of said radiator with a sheath of inert gas, forming an arc at said surface of said radiator in said sheath, and selectively moving said arc over said surface thereby texturing the same.

11. A method of producing a durable high thermal emittance surface as claimed in claim 10 wherein the inert gas is argon.

12. A method of producing a durable high thermal emittance surface as claimed in claim 10 wherein the arc has an open circuit AC voltage of about 0 to about 20 volts.

13. A method of producing a durable high thermal emittance surface as claimed in claim 10 wherein the arc has a current of about 0 to about 15 amperes.

14. A method of producing a durable high thermal emittance surface as claimed in claim 10 wherein the arc has a frequency of about 100 cycles per second.

* * * * *